Patented Aug. 21, 1934

1,970,704

UNITED STATES PATENT OFFICE 1,970,704

COATING COMPOSITION

William Samuel Melvin, Newburgh, N. Y., assignor to E. I. du Pont de Nemours & Company, Wilmington, Del., a corporation of Delaware No Drawing. Application September 22, 1931, Serial No. 564,471

11 Claims. (Cl. 134—17)

This invention relates to coating compositions, and more particularly to coating compositions including rubber and cellulose nitrate or cellulose ethers, and also products coated with such compositions.

Coating compositions containing rubber and cellulose nitrate are not new. For some time it has been appreciated that a coating composition giving films having the toughness of cellulose nitrate films and the elasticity and wearing properties of rubber films would be very advantageous. Such compositions have been prepared by dissolving rubber and cellulose nitrate in a mutual solvent, such as butyl acetate, or in different solvents which are miscible when combined. However, such compositions have not been satisfactory and have not been in commercial use. The homogeneity of the films made from such compositions was only fair and the slight rubbery feel, or tackiness, of the films was disadvantageous.

An object of the present invention is to provide rubber-cellulose nitrate or cellulose ether compositions that will give satisfactory homogeneous films of exceptional toughness, durability and elasticity. A further object is to provide such compositions that will give a film characterized by a dryness and freedom from tackiness.

The above objects are accomplished according to the present invention by the use of rubber and cellulose nitrate, or a cellulose ether, in combination with solvents and diluents and a cellulose derivative plasticizer of low volatility having a solvent action on the rubber. More specifically, the compositions of the present invention comprise rubber, cellulose nitrate, and an aryl or alkyl ester of a fatty acid having from 12–18 carbon atoms inclusive.

The coating composition may be prepared by dispersing the rubber and cellulose nitrate separately in solvents, together with plasticizers, modifying agents, pigments, and the like, and then combining the two dispersions, or by dispersing both the rubber and cellulose nitrate in the same solvent, or mixture of solvents, or as a third alternative, by mechanically blending the rubber and cellulose nitrate with or without modifying agents, pigments, et cetera, in some mechanical equipment such as the type of mixer known in the industry as a "dough" mixer or in a roller mill, and then dispersing the blended composition in a solvent mixture. It is preferred to disperse the rubber and cellulose nitrate separately in solvents and then combine the two dispersions.

The following examples are given to illustrate a specific composition and process of preparing same according to this invention.

*Example 1.*—A dispersion of cellulose nitrate in a mixture of ethyl acetate and denatured ethyl alcohol (containing 9% acetone) was prepared. The composition of the dispersion was:— cellulose nitrate, 17.44%; denatured alcohol, 54.49%; ethyl acetate, 28.07%. Lacquer type cellulose nitrate, having a viscosity characteristic of 170 poises at 12.35% concentration in a 40% ethyl acetate-60% alcohol solution was used. The dispersion was then diluted with toluene until it had a cellulose nitrate concentration of 12.46%.

Crepe rubber was dispersed in a mixture of ethoxy ethyl stearate, ethyl ether of glycol, and toluene, in such proportions as to give the following composition:

|  | Per cent |
|---|---|
| Rubber | 12.35 |
| Ethoxy ethyl stearate | 70.12 |
| Ethyl ether of glycol | 12.27 |
| Toluene | 5.26 |

The cellulose nitrate dispersion and the rubber dispersion were then blended in the ratios of one part cellulose nitrate dispersion to 0.23 part rubber dispersion, and one part cellulose nitrate dispersion to 0.7 part rubber dispersion to give two final compositions having the following percentages:

Formula A

|  | Per cent |
|---|---|
| Cellulose nitrate | 10.08 |
| Denatured alcohol | 31.50 |
| Ethyl acetate | 16.22 |
| Toluene | 24.12 |
| Rubber | 2.36 |
| Ethoxy ethyl stearate | 13.38 |
| Ethyl ether of glycol | 2.34 |
|  | 100.00 |

Formula B

|  | Per cent |
|---|---|
| Cellulose nitrate | 7.27 |
| Denatured alcohol | 22.70 |
| Ethyl acetate | 11.70 |
| Toluene | 18.85 |
| Rubber | 5.15 |
| Ethoxy ethyl stearate | 29.22 |
| Ethyl ether of glycol | 5.11 |
|  | 100.00 |

*Example 2.*—Ethyl cellulose was dispersed in a mixture of ethoxy ethyl stearate, ethyl acetate, and toluene in such proportions as to give the following composition:

| | Per cent |
|---|---|
| Ethyl cellulose | 10.00 |
| Cellosolve stearate | 4.50 |
| Ethyl acetate | 42.30 |
| Toluene | 43.20 |
| | 100.00 |

Rubber was then dispersed in a mixture of ethoxy ethyl stearate, ethyl acetate and toluene in such proportions as to give the following composition:

| | Per cent |
|---|---|
| Rubber | 30.00 |
| Cellosolve stearate | 3.50 |
| Ethyl acetate | 32.90 |
| Toluene | 33.60 |
| | 100.00 |

The ethyl cellulose dispersion and the rubber dispersion were then blended in the ratio of 25 parts of the ethyl cellulose dispersion to 2 parts of the rubber dispersion to give a final composition having the following percentages:

| | Per cent |
|---|---|
| Ethyl cellulose | 9.26 |
| Rubber | 2.22 |
| Cellosolve stearate | 4.43 |
| Ethyl acetate | 41.60 |
| Toluene | 42.49 |
| | 100.00 |

All of the compositions in the above examples gave films of excellent properties characterized by great toughness, elasticity, flexibility, high tensile strength, water resistance, and non-cracking at low temperatures, properties that cannot be obtained by compositions containing cellulose nitrate or rubber as the film forming ingredient alone. The films were essentially homogeneous, although slightly hazy, and differed materially from rubber-cellulose nitrate films heretofore known in being characterized by a dryness and freedom from tackiness entirely unexpected in a film containing rubber.

The above examples merely illustrate preferred embodiments of the invention. The ratios of solvent and plasticizer may be varied widely, as well as the ratio of rubber to cellulose nitrate or cellulose ether. Any mutual solvent for cellulose nitrate, or cellulose ether, and rubber may be used, or mixtures of solvents that will give miscible solutions of rubber and the cellulose derivative. Among the suitable solvents for this purpose are ethyl acetate, butyl acetate, toluene, xylene, the ethyl ethers of glycol, and ethyl alcohol. Suitable pigments and coloring matter may, of course, be added to the composition if desired. The properties of the films resulting from these compositions may be altered in degree by the addition of various modifying agents known in the rubber and cellulose nitrate art, such as fats, fatty oils, waxes, and plasticizers for either the rubber or cellulose derivative alone. The selection and proportioning of such ingredients may be varied widely, as will be obvious to those skilled in the art.

A necessary ingredient of the compositions according to this invention is a cellulose derivative plasticizer of low volatility having a solvent action on the rubber. Ethoxy ethyl stearate is the preferred plasticizer, but both the aryl and alkyl esters of the fatty acids having from 12-18 carbon atoms, inclusive, as a class, are suitable for this purpose. These esters include alkyl stearates, such as butyl, amyl and lauryl stearate, and aryl stearates, such as tetrahydrofurfuryl and fenchyl stearates, ethyl palmitate, lauryl laurate, and cyclohexyl oleate. These esters merely typify the class of esters particularly suitable for use as plasticizers in the compositions of the present invention and it is not intended to limit the invention to the use of these particular plasticizers, as any cellulose derivative plasticizer of low volatility having a solvent action on the rubber is suitable for this purpose, although the plasticizers herein disclosed have been found particularly well adapted for this purpose.

By a "cellulose derivative plasticizer of low volatility" as used herein is meant either a solvent or non-solvent plasticizer for the cellulose derivative having a sufficiently low volatility to remain in a cellulose derivative film substantially permanently at room temperature, and to not volatilize over 40% by weight when heated at 100° C. for 50 hours. Such plasticizers are to be distinguished from high boiling solvents which volatilize slowly from cellulose derivative films at room temperature, but are substantially completely volatilized when heated to 100° C. for 50 hours.

Other cellulose ethers, such as benzyl cellulose, may be used in place of cellulose nitrate in these compositions.

The compositions according to this invention are of general use in coating and of particular value for coating textiles, paper, and other fibrous base materials, for use in upholstery, automobile coverings, sanitary sheetings, window shades, shoe linings, and other articles for which coated fibrous bases are now used. The compositions of the present invention, however, are not limited to such uses as they are extremely satisfactory for the coating of rigid surfaces and they may be used in place of paints and lacquers.

In preparing coated fibrous bases, such as fabrics, paper, and the like, these compositions may be applied to the base by the usual coating apparatus, such as a doctor knife, roller coating machine, and the like, and may be applied in one or a plurality of coats in the same manner as rubber compositions and cellulose nitrate compositions heretofore known in the art have long been applied to fibrous bases.

As many apparently widely different embodiments of this invention may be made without departing from the spirit and scope thereof, it is to be understood that I do not limit myself to the specific embodiments thereof except as defined in the appended claims.

I claim:

1. A composition comprising rubber, a cellulose derivative from the group consisting of cellulose nitrate and cellulose ethers, a solvent medium for said rubber and cellulose derivative and, as a plasticizer, an ester of a fatty acid containing from 12-18 carbon atoms of low volatility having a plasticizing action on the cellulose derivative and a solvent action on the rubber.

2. A composition comprising rubber, cellulose nitrate, a solvent medium for said rubber and cellulose nitrate, and, as a plasticizer, an ester of a fatty acid containing from 12-18 carbon atoms, of low volatility, having a plasticizing action on the cellulose nitrate and a solvent action on the rubber.

3. A composition comprising rubber, cellulose nitrate, a solvent medium for said rubber and cellulose nitrate, and, as a plasticizer, an ester from the group consisting of butyl, amyl tetrahydrofurfuryl, lauryl, fenchyl, and ethoxy ethyl stearates, ethyl palmitate, lauryl laurate, and cyclohexyl oleate.

4. A composition comprising rubber, cellulose nitrate, a solvent medium for said rubber and cellulose nitrate, and, as a plasticizer, an ester of stearic acid of low volatility having a plasticizing action on the cellulose nitrate and a solvent action on the rubber.

5. A composition comprising rubber, cellulose nitrate, a solvent medium for said rubber and cellulose nitrate, and, as a plasticizer, ethoxy ethyl stearate.

6. An article comprising a fibrous base having superposed thereon a film comprising rubber, cellulose nitrate, and, as a plasticizer, an ester of a fatty acid containing from 12–18 carbon atoms, of low volatility, having a plasticizing action on the cellulose nitrate and a solvent action on the rubber.

7. An article comprising a fibrous base having superposed thereon a film comprising rubber, cellulose nitrate, and, as a plasticizer, an ester of stearic acid of low volatility having a plasticizing action on the cellulose nitrate and a solvent action on the rubber.

8. An article comprising a fibrous base having superposed thereon a film comprising rubber, cellulose nitrate, and, as a plasticizer, ethoxy ethyl stearate.

9. A composition comprising rubber, a cellulose derivative from the group consisting of cellulose nitrate and cellulose ethers, a solvent medium for said rubber and cellulose derivative, and, as a plasticizer, an ester from the group consisting of butyl, amyl, tetrahydrofurfuryl, lauryl, fenchyl, and ethoxy ethyl stearates, ethyl palmitate, lauryl laurate, and cyclohexyl oleate.

10. A composition comprising rubber, a cellulose derivative from the group consisting of cellulose nitrate and cellulose ethers, a solvent medium for said rubber and cellulose derivative, and, as a plasticizer, ethoxy ethyl stearate.

11. An article comprising a fibrous base having superposed thereon a film comprising rubber, a cellulose derivative from the group consisting of cellulose nitrate and cellulose ethers, and, as a plasticizer, ethoxy ethyl stearate.

WILLIAM SAMUEL MELVIN.